United States Patent [19]

Iio

[11] 4,090,739
[45] May 23, 1978

[54] VEHICLE ANTI-SKID BRAKE SYSTEM INCLUDING RESTRICTED BY-PASS FLOW PASSAGE

[75] Inventor: Toshimitsu Iio, Hamamatsu, Japan

[73] Assignee: Yamaha Hatsudoki Kabushiki Kaisha, Japan

[21] Appl. No.: 713,489

[22] Filed: Aug. 11, 1976

[30] Foreign Application Priority Data

Aug. 14, 1975 Japan .................................. 50-98110

[51] Int. Cl.² ............................................. B60T 8/02
[52] U.S. Cl. .................................... 303/10; 303/116; 303/119
[58] Field of Search ................. 303/10, 100, 115, 116, 303/117, 119, 61–63, 68–69, 113, 114, 118; 188/181

[56] References Cited

U.S. PATENT DOCUMENTS

| | | | |
|---|---|---|---|
| 3,801,161 | 4/1974 | Sharp | 303/119 |
| 3,802,748 | 4/1974 | Michellone | 303/119 |
| 3,851,929 | 12/1974 | Grosseau | 303/117 |
| 3,893,693 | 7/1975 | Skoyles | 303/119 |

Primary Examiner—Trygve M. Blix
Assistant Examiner—Douglas C. Butler
Attorney, Agent, or Firm—Dennis P. Clarke

[57] ABSTRACT

Anti-skid brake system suitable for use with a motorcycle or a small-sized car. The system includes a solenoid operated skid control valve which has a normal position, a brake pressure releasing position and a blocking position between the two positions. The valve is spring biased toward the normal position to direct braking pressure to the wheel brake actuator but is shifted to the pressure releasing position for anti-skid operation. The valve is prevented from returning to the normal position from the pressure releasing position as long as pressure is supplied from the master cylinder, but is retained in the blocking position when the brake pressure supply line is blocked. A restricted bypass flow passage is provided across the control valve so as to provide a restricted supply of fluid pressure in second and subsequent application of brake pressure.

5 Claims, 6 Drawing Figures

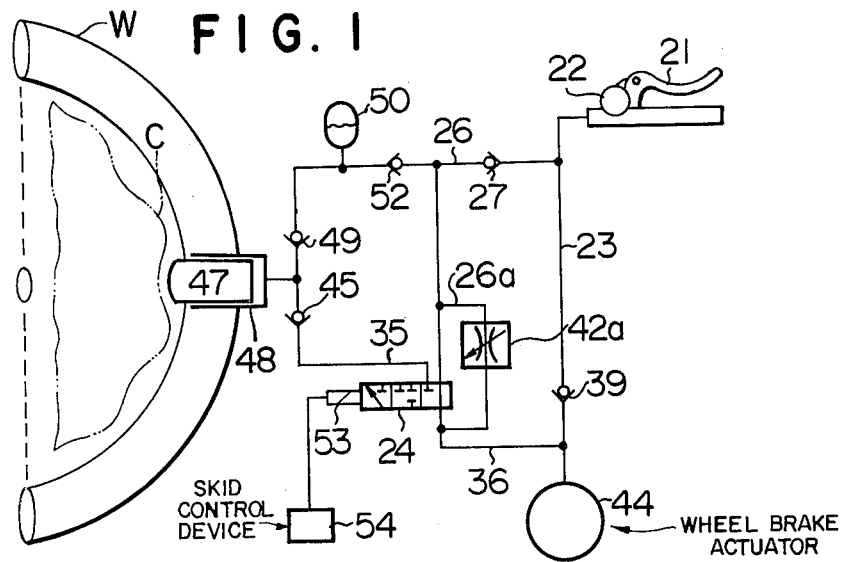
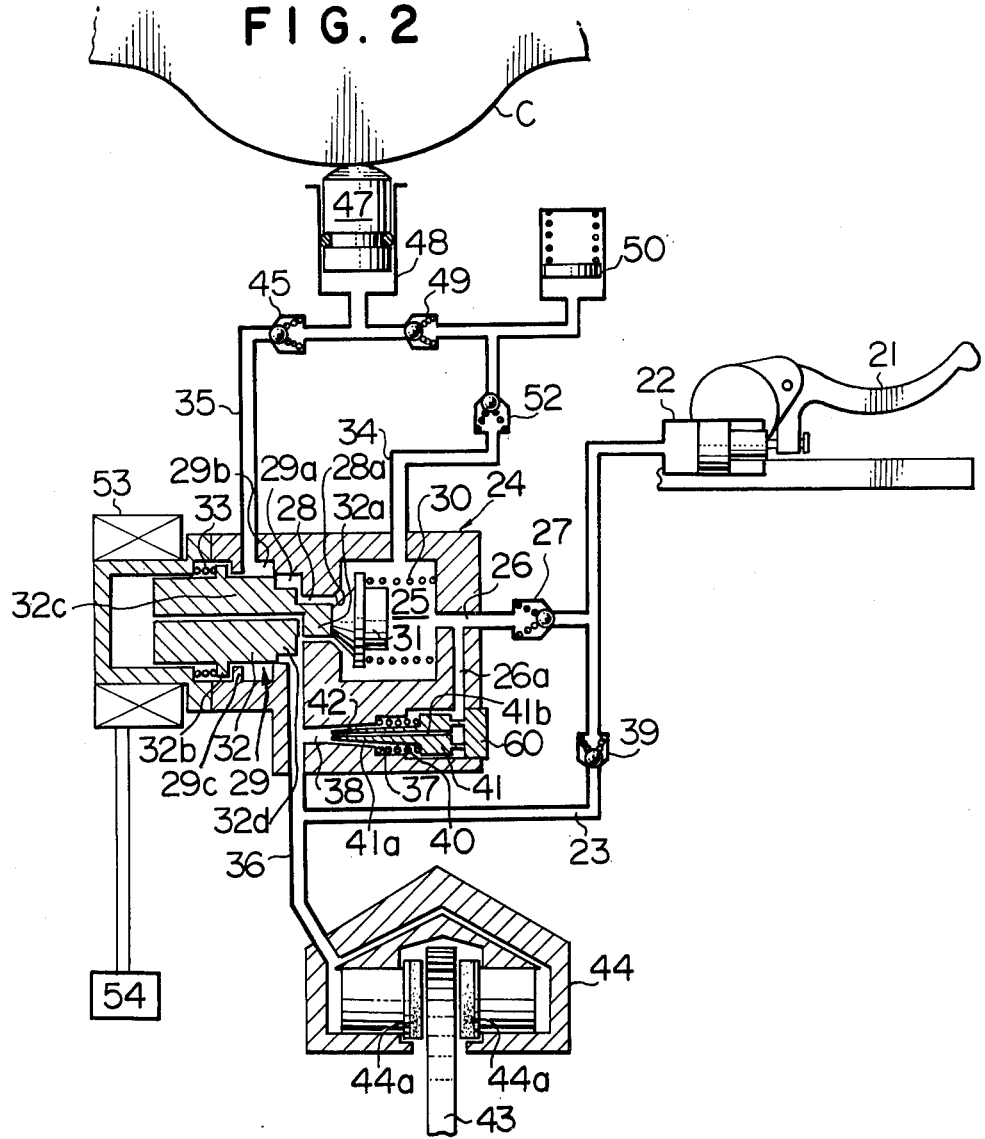

VEHICLE ANTI-SKID BRAKE SYSTEM INCLUDING RESTRICTED BY-PASS FLOW PASSAGE

The present invention relates to vehicle brake system and more particularly to brake systems suitable for use with relatively small vehicles such as motorcycles.

In vehicles, it has been recognized that excessive braking efforts applied to vehicle wheels often cause wheel lock or similar condition which may result in skidding of vehicles. In order to eliminate such skidding, there has already been proposed to provide an anti-skid brake system in which brake pressure is momentarily released or reduced when the wheel lock or similar condition has been sensed so as to restore rotation of the wheel. When the rotation of wheel is thus restored, the brake pressure is again increased. In this manner, brake pressure is repeatedly applied to the wheel avoiding vehicle skidding due to wheel locking or similar condition.

In conventional anti-skid brake system of this type, when brake pressure is repeatedly applied in the aforementioned manner, the rate of increase in the brake pressure in the second or subsequent application is the same as that of the first application. Therefore, if the rate of increase in the brake pressure is of such a value that is sufficient to cause skidding and provide a required response in the first application of brake, the same excessive braking effort may also be applied in the second or subsequent application thereby possibly causing skidding. On the other hand, if the rate is of such a value that avoids excessive braking effort in the second and subsequent brake applications, it will not be possible to achieve a desired braking action in the first instance.

In order to eliminate the above problems, it has already been proposed, to provide a subsidiary restricted brake pressure supply line in addition to a main unrestricted brake pressure supply line so that the main pressure line is blocked and the brake pressure is supplied only through the subsidiary line in the second and subsequent brake application. In the proposed arrangement, a solenoid valve is provided in addition to a solenoid operated skid control valve so as to alternately open the main and subsidiary lines to the wheel brake actuator.

The arrangement has been found disadvantageous, however, in that complicated electrical circuits must be provided for energizing the solenoid valve upon detection of wheel lock and holding the valve in the energized position throughout the second and subsequent application of brake. Further, the arrangement using such a solenoid valve has not been satisfactory interval st.

It is therefore an object of the present invention to provide a novel vehicle anti-skid brake system which is particularly suitable for use in small-sized vehicles.

Another object of the present invention is to provide a vehicle anti-skid brake system which requires only a single solenoid operated skid control valve for releasing brake pressure in anti-skid operation and also for decreasing the rate of increase in the brake pressure in second and subsequent application of brake pressure in the anti-skid operation.

A further object of the present invention is to provide a vehicle anti-skid brake system which is simple and reliable as compared with conventional brake systems.

According to the present invention, the above and other objects can be accomplished by a vehicle brake system comprising brake master cylinder means for producing fluid pressure when actuated, fluid pressure operated wheel brake actuating means, brake pressure supply passage means between said master cylinder means and said brake actuating means, fluid return passage means between said master cylinder means and said brake actuating means, solenoid operated skid control valve means provided in said brake pressure supply passage means, said skid control valve means having a normal operating position wherein the brake pressure supply passage means is opened to connect the master cylinder means with the brake actuating means, a brake pressure releasing position wherein the brake actuating means is connected with low pressure zone of the system so that the pressure in the brake actuating means is released and a blocking position between said two positions wherein the brake pressure supply passage means is blocked, bypass passage means provided in the brake pressure supply passage means across the control valve means and having flow restriction means therein, skid control means for producing an output which is used to energize the valve means to shift it to the pressure releasing position when it is sensed that vehicle wheel is being locked to an extent that skidding may be produced, means being provided for hydraulically holding the control valve means at the brake pressure releasing position by prohibiting the valve means from returning beyond said pressure releasing position to said normal position after it has been energized and then deenergized so that fluid pressure can be supplied only through the restricted bypass passage means.

According to a preferable aspect of the present invention, auxiliary passage means is further provided between the master cylinder means and the control valve means so that the brake actuating cylinder means is connected with the auxiliary passage means when the valve means is in the pressure releasing position to release fluid pressure thereto. In the auxiliary passage means, there is provided return pump means which serves to return hydraulic fluid in the auxiliary passage means to the master cylinder means, the outlet pressure of the return pump means being utilized to hold the control valve means in the pressure releasing position. Check valve means may be provided between the control valve means and the return pump means, and also between the return pump means and the master cylinder means so as to allow fluid flow only in the direction of the master cylinder means.

The control valve means may include a valve member which is axially movable between the normal and the pressure releasing positions beyond the blocking position between the two positions, and resiliently biased toward the normal position. Means is provided to restrict the valve member from returning to the normal position and hold it at the blocking position under the pressure delivered by the return pump means or the pressure in the brake pressure supply passage means.

The above and other objects and features of the present invention will become apparent from the following description of a preferred embodiment taking reference to the accompanying drawing, in which:

FIG. 1 is a schematic illustration of a vehicle brake system in accordance with one embodiment of the present invention;

FIG. 2 is a further view of the brake system shown in FIG. 1 but specifically showing the skid control valve in detail;

Figure 3A:
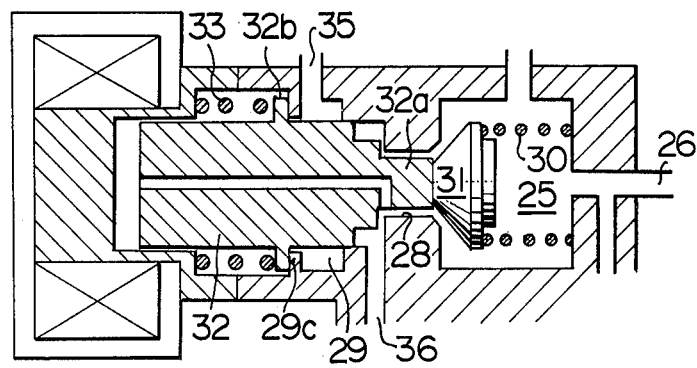
Figure 4:
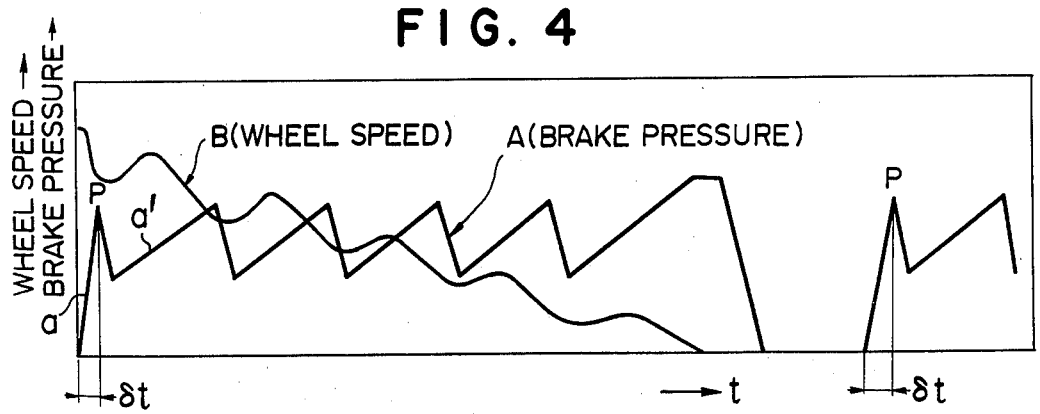

FIGS. 3(A), (B) and (C) are sectional views showing the operation of the control valve; and FIG. 4 is a diagram showing the changes in the brake pressure and the wheel speed.

Referring to the drawings, particularly to FIG. 1, the brake system shown therein includes a master cylinder 22 which is actuated by an operating handle 21. The master cylinder 22 has an outlet which is connected with a pressure line 26 having a check valve 27 for allowing fluid flow only from the master cylinder 22. The pressure line 26 is connected through a skid control valve 24 with an actuator inlet conduit 36 which is in turn connected with a wheel brake actuator 44. A fluid return line 23 is further provided between the master cylinder 22 and the actuator 44, and includes a check valve 39 which allows fluid flow only toward the master cylinder 22.

There is also provided a brake pressure releasing line 35 which extends from the control valve 24 and connected with the pressure line 26 at a position between the check valve 27 and the control valve 24. In order to prevent the pressure in the line 26 from being transmitted to the line 35, a check valve 52 is provided in the line 35. The control valve 24 is of a solenoid operated type and has a normal position wherein the line 26 is connected with the actuator inlet conduit 36, a brake pressure releasing position wherein the actuator inlet conduit 36 is connected with the pressure releasing line 35 and a blocking position between said two positions wherein the lines 26 and 35 are disconnected from the inlet conduit 36. The valve 24 is normally biased to assume the normal position but shifted to the pressure releasing position when energized. For the purpose, the valve 24 has a solenoid 53 and a conventional skid control device 54 is provided for producing an output which is utilized to energize the solenoid 53.

In the pressure releasing line 35, there is provided a fluid return pump including a piston 47 which reciprocates in a cylinder 48. The pump cylinder 48 has an output connected with the line 35 and check valves 45 and 49 are disposed at the opposite sides of the connection of the pump cylinder output to the line 35 so as to direct fluid flow from the control valve 24 to the line 26. The piston 47 is actuated by a rotatable cam C which may be driven by the wheel W to which the brake system is associated. Between the check valves 49 and 52, there is provided a pressure accumulator 50.

Between the pressure line 26 and the inlet conduit 36, there is further provided a bypass passage 26a having an adjustable restriction 42 across the control valve 24.

Referring more specifically to FIG. 2, the skid control valve 24 includes a control chamber 25 which is connected with the pressure line 26 and has therein a floating valve member 31. There is also formed a stepped valve chamber 29 which has a small diameter portion 29a and a large diameter portion 29b. An inwardly projecting flange 29c is provided in the large diameter portion 29b of the chamber 29. The control chamber 25 is connected through a passage 28 with the small diameter portion 29a of the valve chamber 29. The passage 28 is provided at an end adjacent to the control chamber 25 with a valve seat 28a for the floating valve 31. A spring 30 is disposed in the chamber 25 to bias the valve member 31 toward the valve seat 28a.

In the valve chamber 29, there is disposed a valve member 32 which has at one end a projection 32a of such a diameter that allows it to freely pass through the passage 28 with a substantial clearance. The valve member 32 is formed with a radially outwardly extending flange 32b for abutting co-operation with the flange 29c formed in the valve chamber 29. The valve member 32 further has a large diameter portion 32c and a small diameter portion 32d between the portions 32a and 32c the former being of such a diameter that can closely fit the small diameter portion 29a of the valve chamber 29 but the latter being smaller in diameter than the small diameter portion 29a of the chamber 29.

The valve member 32 is resiliently biased by means of a spring 33 toward the chamber 25. The spring 33 is stronger than the spring 30 so that the valve member 32 is shifted to the extreme right position until the flange 32b abuts the flange 29c. In this position, the projection 32a is inserted into the passage 28 and forces the floating valve member 31 apart from the valve seat 28a.

The large diameter portion 29b of the valve chamber 29 is connected with the pressure releasing line 35 and the small diameter portion 29a with the actuator inlet line 36. As shown in FIG. 2, the brake actuator 44 includes a pair of brake shoes 44a which are adapted to engage with a brake disc 43 mounted on the associated wheel. The valve member 32 is of course drawn toward left electromagnetically against the action of the spring 33 when the solenoid 53 is energized.

In the illustrated embodiment, the bypass passage 26a is formed in the body of the valve 24 and has a restriction chamber 37 which is connected through a tapered passage 38 with the actuator inlet conduit 36. In the chamber 37, there is disposed a restricting member 41 having a tapered portion 41a inserted into the tapered passage 38. Thus, a restricted flow passage 42 is provided between the tapered portion 41a and the wall of the passage 38. Further, the restricting member 41 has an axially extending restricted passage 41b. The restricting member 41 is biased by means of a spring 40 in such a direction that the area of the restricted passage 42 is increased. An adjusting screw 60 is provided to stop the displacement of the member 41 against the influence of the spring 40. Through a suitable adjustment of the screw 60, it is possible to determine the area of the passage 42 as desired.

Under a normal condition, the valve member 32 is shifted under the influence of the spring 33 rightwards until the flange 32b engages with the flange 29c. Thus, the valve member 31 is moved apart from the valve seat 28a by the projection 32a on the valve member 32 to open the passage 28 as shown in FIGS. 2 and 3(A).

When the master cylinder 22 is actuated by the handle 21, the hydraulic pressure produced therein is transmitted through the check valve 27 and the pressure line 26 to the chamber 25 from where the pressure is further transmitted through the passage 28, the small diameter portion 29a of the valve chamber 29 and the conduit 36 to the brake actuator 44. The pressure is also transmitted through the bypass passage 26a and the restricted passage 42 to the conduit 36. Thus, the hydraulic pressure in the brake actuator 44 is increased relatively rapidly as shown by a in FIG. 4 within a relatively short time interval st.

When the control device 54 detects that the associated wheel is being locked and that there is a danger of vehicle skidding, it produces an electric output and the solenoid 53 of the control valve 24 is energized thereby.

Figure 3B:
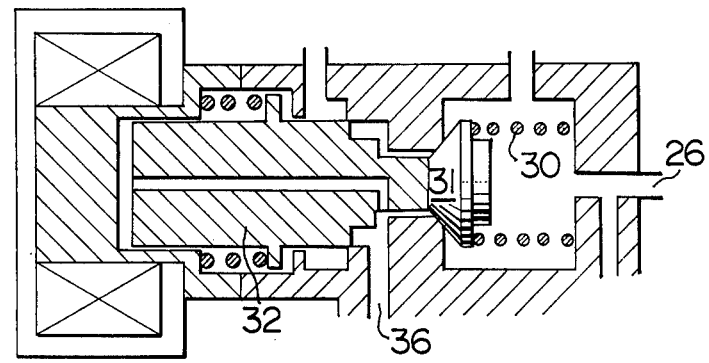
Figure 3C:
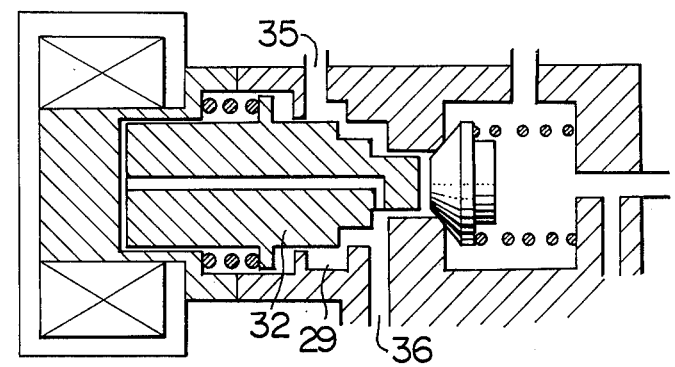

Thus, the valve member 32 is shifted toward left against the influence of the spring 33 to the position shown in FIG. 3(C). The floating valve member 31 is then moved under the action of the spring 30 toward left until it seats on the valve seat 28a to close the passage 28. At the same time, the actuator inlet conduit 36 is opened through the chamber 29 to the pressure releasing passage 35 so that the fluid pressure in the brake actuator 44 is released through the conduit 36 and the chamber 29 into the line 35 where the fluid is further forced through the line 34 to the chamber 25 by means of the return pump when the pumpt outlet pressure is higher than the pressure prevailing in the chamber 25.

The reduction in pressure in the brake actuator 44 allows recovery of wheel rotating speed and when the wheel rotation is thus restored to an adequate value the output of the control device 54 is turned off to de-energize the solenoid 53. The valve member 32 is thus allowed to move toward right under the action of the spring 33, however, since the floating valve member 31 is held against the valve seat 28a under the hydraulic pressure prevailing in the control chamber 25, the valve member 32 is restricted from returning to the initial position but maintained at the position shown in FIG. 3(B) where the conduit 36 is isolated from both of the control chamber 25 and the pressure releasing line 35.

Thus, it will be understood that the pressure line 26 is now connected with the actuator inlet conduit 36 only through the bypass line 26a having the restricted passages 41b and 42. Therefore, the pressure in the brake actuator 44 is increased again but with a slower rate as shown by a' in FIG. 4.

When the brake handle 21 is released, the pressure in the brake actuator 44 is released through the return line 23. At the same time, the pressure in the control chamber 25 and also in the line 35 is released through the bypass line 26a and the return line 23 to the master cylinder 22. Therefore, the valve member 31 is moved toward right to the initial position shown in FIG. 3(A).

From the above description, it will be noted that the single solenoid operated skid control valve 24 can provide a brake pressure releasing function for anti-skid operation as well as a necessary decrease in the rate of increase in the second and subsequent application of brake pressure. Such rate of pressure increase can be adjusted as desired by means of the adjusting screw 60. The arrangement is further advantageous from the viewpoint of safety because minimum fluid flow can be ensured through the bypass passage 26a even when there is a failure such as sticking in the control valve 24. Further, the aforementioned intermittent release of brake pressure is not transmitted directly to the master cylinder 22 but blocked off by the check valve arrangement, so that the reaction force applied to the handle 21 will not be affected by the anti-skid operation of the system.

The invention has thus been shown and described with reference to a specific embodiment, however, it should be noted herein that the invention is in no way limited to the details of the illustrated arrangement but changes and modifications may be made without departing from the scope of the appended claims.

I claim:

1. Anti-skid vehicle brake system comprising brake master cylinder means for producing fluid pressure when actuated, fluid pressure operated wheel brake actuating means, brake pressure supply passage means between said master cylinder means and said brake actuating means, skid control valve means provided in said brake pressure supply passage means, said skid control valve means having a normal operating position wherein the brake pressure supply passage means is opened to connect the master cylinder means with the brake actuating means, a brake pressure releasing position wherein the brake actuating means is connected with low pressure zone of the system so that the pressure in the brake actuating means is released and a blocking position between said two positions wherein the brake pressure supply passage means is blocked, bypass passage means provided in the brake pressure supply passage means across the control valve means and having adjustable means therein for restricting to a predetermined minimum the flow of fluid therein, said adjustable means being adjusted such that said bypass passage means is always at least partially open, skid control means for producing an output which is used to energize the valve means to shift it to the pressure releasing position when it is sensed that vehicle wheel is being locked to an extent that skidding may be produced, means being provided for hydraulically holding the control valve means at the blocking position by prohibiting the valve means from returning beyond said blocking position to said normal position after it has been energized and then de-energized so that fluid pressure can be supplied only through the restricted bypass passage means.

2. Anti-skid vehicle brake system in accordance with claim 1 in which said low pressure zone comprises auxiliary passage means connected at one end with the control valve means and at the other end with the pressure supply passage means at a position between the master cylinder means and the control valve means in such a manner that the brake actuating means is connected with the auxiliary passage means when the control valve means is in the brake pressure releasing position, said auxiliary passage means including return pump means provided therein, first check valve means between the control valve means and the return pump means for allowing fluid flow only toward the return pump means and second check valve means between the return pump means and the pressure supply passage means for allowing fluid flow only toward the pressure supply passage means.

3. Anti-skid vehicle brake system in accordance with claim 2 in which said control valve means comprises a valve chamber, a control chamber connected through a passage with the valve chamber, a first valve member disposed in said valve chamber for movement between said normal position and said pressure releasing position through said blocking position, said first valve member being resiliently biased toward the normal position, a second valve member disposed in said control chamber and resiliently biased to a position where it closes the passage between the control and valve chambers, said first valve member having projection means adapted to be inserted into said passage for displacing said second valve means under the biasing force on the first valve member against the biasing force on the second valve member so as to open the passage between the control and valve chambers when the first valve member is in the normal position, said pressure supply passage means being connected with said control chamber so that fluid pressure is supplied to the brake actuating means through said control chamber and said valve chamber when said passage between the chambers is opened but the fluid pressure in the control chamber serves to hold the second valve member at the position wherein it closes the passage between the chambers when the first valve member is displaced from the normal position, whereby the first valve member is prevented from returning to the normal position due to the engagement between the projection means on the first valve member with the second valve member.

4. Anti-skid vehicle brake system in accordance with claim 2 in which said pressure supply passage means includes third check valve means disposed between the master cylinder means and said position where the auxiliary passage means is connected with the pressure supply passage means for allowing fluid flow only from the master cylinder means.

5. Anti-skid vehicle brake system in accordance with claim 1 in which said pressure supply passage means includes third check valve means disposed between said master cylinder means and control valve means for allowing fluid flow only from the master cylinder means.

* * * * *